United States Patent
Rodeghiero et al.

(10) Patent No.: US 7,207,916 B2
(45) Date of Patent: Apr. 24, 2007

(54) TRANSMISSION FOR POWER TAKE-OFF

(75) Inventors: Reno Antonio Rodeghiero, Hudson, IA (US); Werner Stettler, Cedar Falls, IA (US); Barbara Klabunde, Malsch (DE); James Albert Niebergall, Buckingham, IA (US)

(73) Assignee: Deere & Company, Moline, IL (US)

( * ) Notice: Subject to any disclaimer, the term of this patent is extended or adjusted under 35 U.S.C. 154(b) by 166 days.

(21) Appl. No.: 11/029,683

(22) Filed: Jan. 5, 2005

(65) Prior Publication Data
US 2006/0148607 A1 Jul. 6, 2006

(51) Int. Cl.
*F16H 47/04* (2006.01)
(52) U.S. Cl. .......................................... 475/78; 475/72
(58) Field of Classification Search ................ 475/207, 475/83, 80, 81, 5, 72, 76, 77, 312, 218, 318, 475/325; 74/15.4, 15.6, 15.63, 15.66, 15.69; 192/41 A
See application file for complete search history.

(56) References Cited

U.S. PATENT DOCUMENTS

| | | | |
|---|---|---|---|
| 4,519,485 A * | 5/1985 | Greenwood | 477/2 |
| 5,682,315 A * | 10/1997 | Coutant et al. | 701/57 |
| 6,416,437 B2 * | 7/2002 | Jung | 475/8 |
| 6,485,387 B1 * | 11/2002 | Goodnight et al. | 475/76 |
| 6,692,395 B2 | 2/2004 | Rodeghiero et al. | 475/77 |
| 6,986,725 B2 * | 1/2006 | Morscheck | 475/210 |
| 2003/0205422 A1 | 11/2003 | Morrow et al. | 180/65.2 |

FOREIGN PATENT DOCUMENTS

| | | |
|---|---|---|
| DE | 19749074 | 5/1999 |
| JP | 57144129 | 9/1982 |
| JP | 2001315541 | 11/2001 |

* cited by examiner

*Primary Examiner*—Dirk Wright
*Assistant Examiner*—Derek D. Knight

(57) ABSTRACT

A PTO transmission transmits power from an engine-driven shaft to a PTO shaft. The transmission includes a variable displacement hydraulic pump driven by the engine-driven shaft. A planetary transmission unit includes a ring gear driven by the engine-driven shaft, a planet carrier drivingly coupled to the PTO shaft, planet gears rotatably mounted on the planet carrier and in meshing engagement with the ring gear, and a sun gear in meshing engagement with the planet gears and drivingly connected to a fixed displacement variable speed hydraulic motor hydraulically driven by the pump. A one-way clutch is coupled to the sun gear. The one-way clutch allows the sun gear to rotate in only one direction so that at rated engine speed all power is transmitted mechanically.

5 Claims, 1 Drawing Sheet

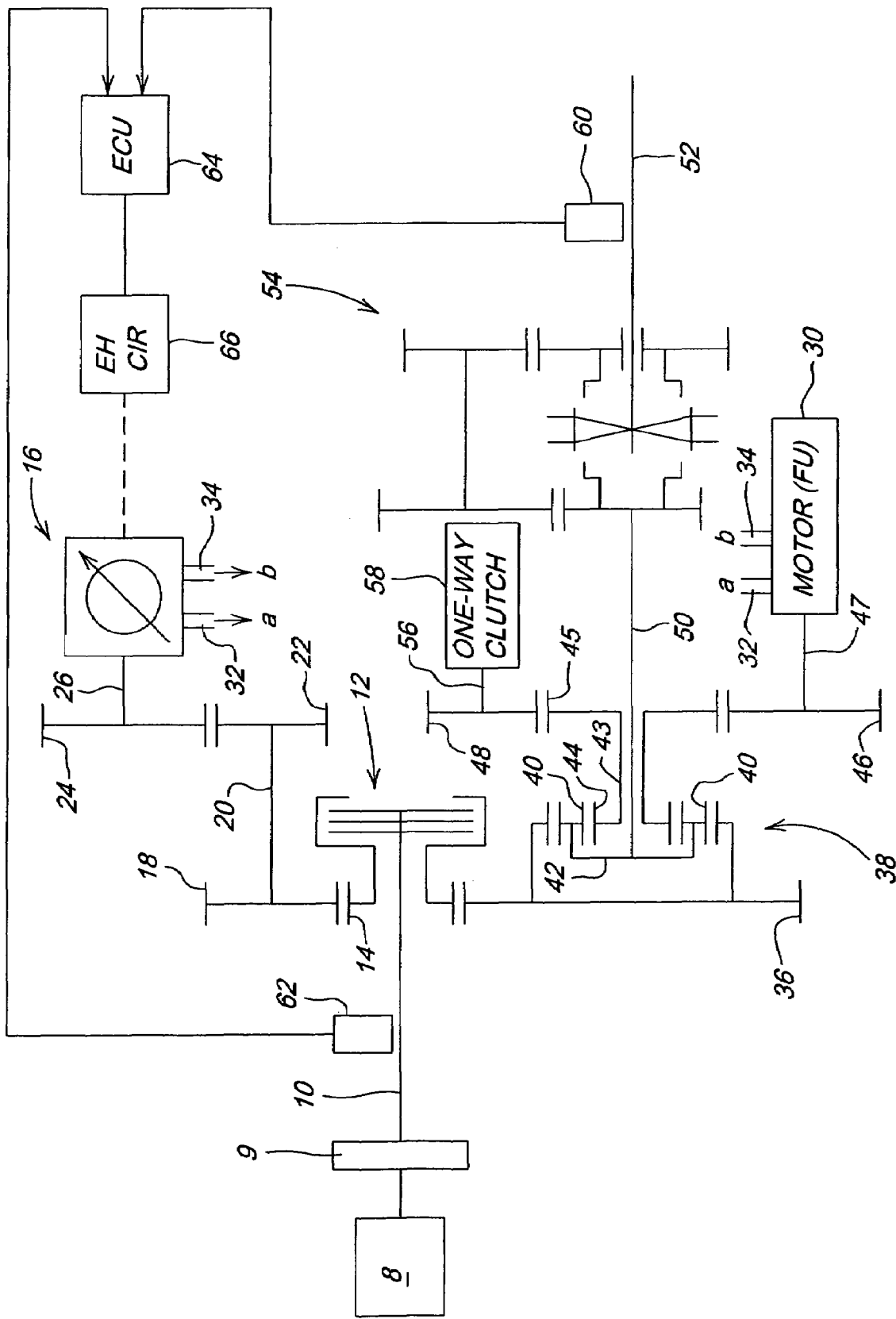

TRANSMISSION FOR POWER TAKE-OFF

BACKGROUND OF THE INVENTION

The present invention relates to a mechanism for transmitting power from an engine shaft to a power take-off (PTO) shaft.

A PTO transmission system with a planetary gear split power transmission unit is described in U.S. Pat. No. 6,692,395, issued on 17 Feb. 2004 and assigned to the assignee of this application. With this system, power can be transmitted from an engine to a PTO shaft, and the PTO shaft speed can be maintained constant regardless of variations in engine speed.

This transmission has an output connected to a PTO shaft, a first input connected to an engine output shaft and a second input connected to an output of a fixed displacement hydraulic motor. The motor is driven by a variable displacement hydrostatic pump which is driven by the engine output shaft. A control unit controls the speed of the variable speed drive unit as a function of sensed engine speed and to maintain the PTO shaft at a constant speed.

This system transmits power to the PTO shaft from both the engine and from the variable speed drive unit. Maintaining a constant PTO shaft speed allows PTO driven implements, such as a grass/hay spreader, to be run optimally. This system also increases fuel economy and reduces noise.

However, with this transmission, when the engine is running at speeds at or higher than rated engine speed, the sun gear on the planetary must be locked up so that all power is transmitted mechanically. This lockup of the sun gear can be accomplished by commanding the pump to zero displacement, which prevents rotation of the hydraulic motor that is coupled to the sun gear. However, this requires a larger motor with a large torque capacity in order to prevent rotation of the sun gear in this situation.

SUMMARY

Accordingly, an object of this invention is to provide a compact transmission which maintains a constant PTO speed despite variations in engine speed.

This and other objects are achieved by the present invention, wherein a PTO transmission includes a planetary transmission with a ring gear driven by the engine, and a planet carrier connected to a PTO shaft. The engine also drives a variable displacement hydraulic pump. The sun gear of the planetary transmission is coupled to a fixed displacement hydraulic motor which is powered by the variable displacement pump. A control unit controls the displacement of the variable displacement pump to maintain the PTO shaft at a constant speed.

A one-way clutch is also coupled by gears to the planetary sun gear. The one-way clutch is free to rotate in only one direction, but locks up and will not rotate in the opposite direction. This prevents rotation of the sun gear in a corresponding direction so that all power is transmitted mechanically. The addition of the one-way clutch results in a less costly and more compact assembly because a smaller hydraulic motor may be used.

BRIEF DESCRIPTION OF THE DRAWINGS

FIG. 1 is a simplified schematic diagram of a PTO transmission system according to the present invention.

DETAILED DESCRIPTION

Referring now to FIG. 1, engine 8 drives shaft 10 (which rotates counter-clockwise when viewed from the rear or right with respect to FIG. 1) via a speed reduction gear unit 9. Shaft 10 drives a PTO transmission clutch 12, which drives a PTO clutch gear 14. Clutch gear 14 drives a variable displacement hydraulic pump 16 via gear 18, shaft 20 gears 22, 24 and shaft 26. Pump 16 circulates hydraulic fluid to a fixed displacement motor 30 via hydraulic lines 32 and 34. Pump 16 and motor 30 comprise a variable speed unit.

Clutch gear 14 also drives a ring gear 36 of planetary transmission unit 38 which includes planet gears 40 coupled to the ring gear 36 and rotatably mounted on planet carrier 42. The planetary unit also includes a smaller sun gear 44 non-rotatably mounted on an end of a hollow shaft 43 and coupled to the planet gears 40. A larger sun gear 45 is non-rotatably mounted on the other end of shaft 43 and is coupled to a motor gear 46 and to a one-way clutch gear 48. Motor gear 46 is driven by motor 30 via shaft 47. A shaft 50 couples planet carrier 42 to 540/1000 RPM PTO shaft 52 via a conventional 2-speed PTO range shift unit 54. Shaft 52 rotates in the clockwise direction when viewed from the rear (right).

Preferably, a PTO speed sensor 60 senses the rotation speed of PTO shaft 52. An engine shaft speed sensor 62 senses the rotation speed of engine driven shaft 10. An electronic control unit (ECU) 64 controls the displacement of pump 16 via a conventional electrohydraulic circuit 66 as a function of the speed signals from sensors 60 and 62.

A shaft 56 couples clutch gear 48 to a one-way clutch unit 58, such as a Sprag clutch, which can rotate in the counter-clockwise direction, but not in the clockwise direction when viewed from the rear or right with respect to FIG. 1. The one-way clutch 58 thus prevents rotation of the sun gear 44 in a corresponding direction and thereby prevents rotation of pear 46 and motor 30 so that when the engine 8 is run at speeds at or higher than rated engine speed 100% of the power is transferred mechanically through the planetary gear sets.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A system for transmitting power from an engine-driven shaft to a PTO shaft, comprising:
    an engine driven variable speed drive unit;
    a split power transmission having a first input member coupled to the engine-driven shaft, a second input member driven by the variable speed drive unit, and an output member coupled to the PTO shaft, the output member receiving power from the first and second input members and having a rotation speed which is a function of a rotation speed of the first and second input members; and
    a one-way clutch coupled only to the second input member, the one-way clutch preventing the second input member from rotating in one direction so that at or above rated engine speed all power is transmitted mechanically from the first input member to the PTO shaft.

2. The system of claim 1, wherein the transmission comprises:
a ring gear driven by the engine-driven shaft;
a planet carrier drivingly coupled to the PTO shaft; and planet gears rotatably mounted on the planet carrier and in meshing engagement with the ring gear; and
a sun gear in meshing engagement with the planet gears and drivingly connected to the variable speed drive unit and to the one-way clutch.

3. The system of claim 1, wherein:
the one-way clutch comprises a sprag clutch.

4. A system for transmitting power from an engine-driven shaft to a PTO shaft, comprising:
a variable displacement hydraulic pump driven by the engine-driven shaft;
a ring gear driven by the engine-driven shaft;
a planet carrier drivingly coupled to the PTO shaft;
planet gears rotatably mounted on the planet carrier and in meshing engagement with the ring gear; and
a sun gear in meshing engagement with the planet gears;
a fixed displacement variable speed hydraulic motor hydraulically driven by the pump and having a motor drive shaft drivingly coupled to the sun gear; and
a one-way clutch coupled only to the sun gear, the one-way clutch allowing the sun gear to rotate in only one direction so that at or above rated engine speed all power is transmitted mechanically through the planet carrier.

5. A system for transmitting power from an engine-driven shaft to a PTO shaft, comprising:
a variable displacement hydraulic pump driven by the engine-driven shaft;
a planetary transmission unit comprising a ring gear driven by the engine-driven shaft, a planet carrier drivingly coupled to the PTO shaft, planet gears rotatably mounted on the planet carrier and in meshing engagement with the ring gear, and a sun gear in meshing engagement with the planet gears;
a fixed displacement variable speed hydraulic motor hydraulically driven by the pump and having a variable speed motor drive shaft drivingly coupled to the sun gear; and
a one-way clutch coupled only to the sun gear, the one-way clutch allowing the sun gear to rotate in only one direction so that at or above rated engine speed all power is transmitted mechanically through the planet carrier.

* * * * *